Patented May 30, 1939

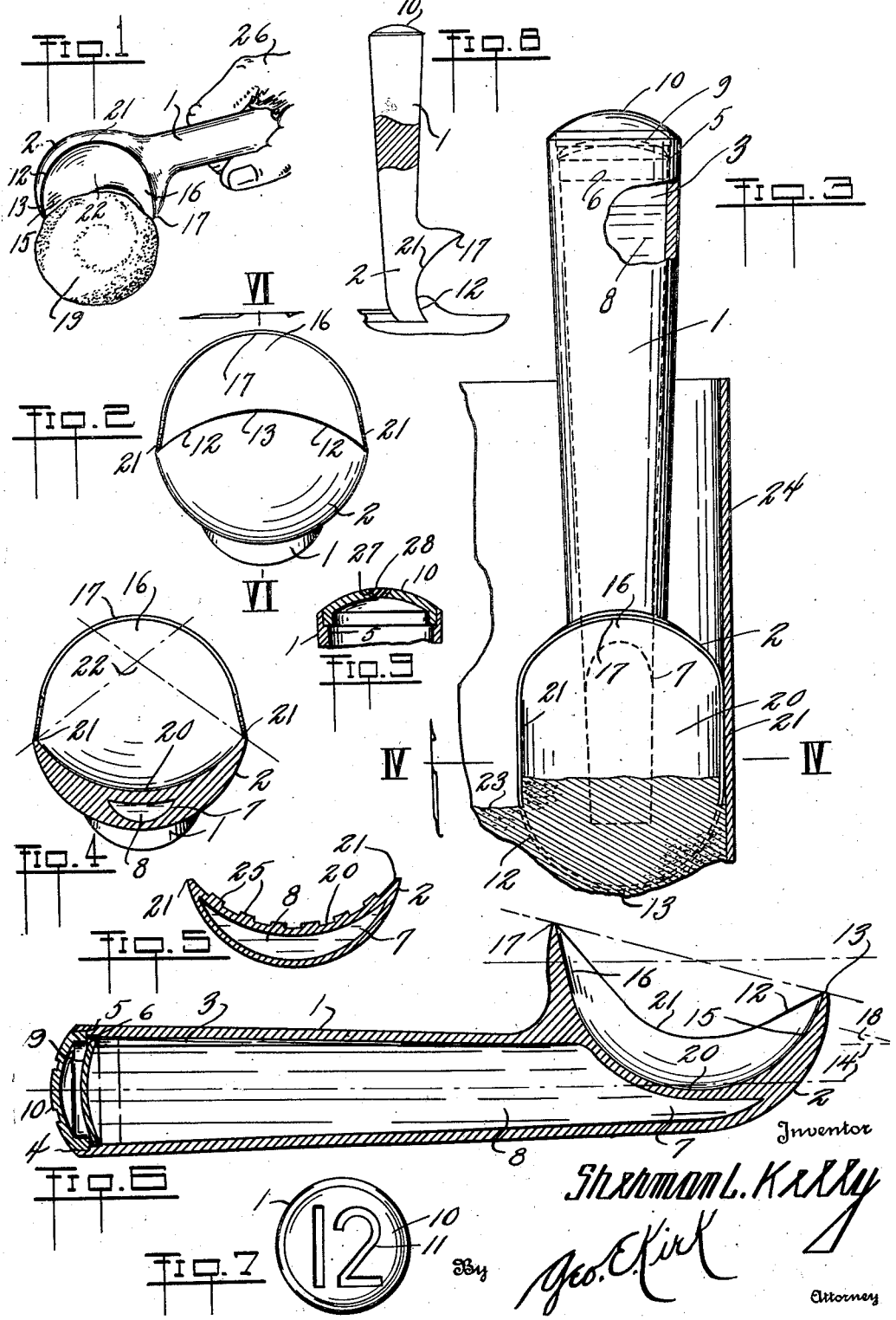

2,160,023

UNITED STATES PATENT OFFICE 2,160,023

TOOL FOR HANDLING CONGEALED MATERIALS

Sherman L. Kelly, Toledo, Ohio

Continuation of application Serial No. 22,946, May 23, 1935. This application March 28, 1938, Serial No. 198,601

14 Claims. (Cl. 107—48)

This invention relates to dispensers.

This invention has utility when incorporated in a tool or ice cream scoop for gathering portions of congealed material from a mass such as ice cream and the like, and forming said gather portion into a service portion or roll. A further feature of this invention is that in the gathering there is practically no compression of the material and the portion readily separates from and freely slides clear of the tool without the use of an ejector.

Referring to the drawing:

Fig. 1 is a view of the tool depositing a collected quantity of material;

Fig. 2 is an end elevation of the tool from the severing rim terminal;

Fig. 3 is an elevation of the tool in initial position within a container for gathering a portion of material.

Fig. 4 is a view on the line IV—IV, Fig. 3;

Fig. 5 is a view similar to Fig. 4, in which the forming face of the bowl is ribbed and the temperature controlling chamber enlarged;

Fig. 6 is a view on the line VI—VI, Fig. 2;

Fig. 7 is a view of the device of Fig. 6 from the left thereof;

Fig. 8 is a side view of the tool in gathering operation; and

Fig. 9 is a section through the handle terminus showing a modified closure plug therefor.

The tool comprises a directing handle 1 and bowl 2 integral therewith. The handle 1 is preferably of tapered tubular form to provide chamber 3 therein. The handle terminal 1 remote from the bowl 2 has open end 4 providing circumferentially extending seats 5, 6, therein. The chamber 3 extends throughout the handle length and terminates in chamber 7 in proximity to the bowl 2.

This continuous chamber 3, 7, may be partially filled with liquid 8, such as alcohol or even water; the liquid being one preferably having a high heat conductivity. When the chamber 3, 7, is charged with the desired quantity of liquid, snap plug 9 may engage the seat 7 to seal the liquid therein, while finish plug 10 may be pressed into the seat 5 as a handle terminus. The plug 10 may bear legend 11 as a means for readily identifying the size or other data of the tool.

It has been found in practice that the bowl 2, especially in approximating certain critical contours, may operate to gather a portion of congealed material into a roll without compression of the material, and the resulting roll will simulate a ball. To this end, severing rim 12 of the bowl is an arc of a circle and has the apex 13 of said rim disposed approximately bowl depth from the center line or axis 14 of the handle 1. The bowl has concave face 15 etxending from the rim 13 as an arc of slightly less than spherical form, the radius of which is constant throughout the major portion of said face. At its portion remote from the rim 12, however, it merges into portion 16 approximating a greater radius, even approaching parallel straight lines. This portion 15 therefrom terminates in rim portion 17 oppositely from the severing portion 13.

The entire extent of the face 15, 16, is approximately 180° with increased radius in a region of approximately 15° at the angle 18 between a straight line passing through the apex 13 and the apex of the rim portion 17 as to the axis 14. This major concave extent of the bowl, due to its form, tends to form a roll of the congealed material as a volute 19 of ball-approaching form, which is retained as the open face of the tool is upward. However, upon orienting the tool, the portion gathered is readily discharged from the bowl. The portion 16 avoids adhering action or any tendency to shatter or distort the gather. The line 14 of the handle 1 is to the depth of the bowl 2. The bowl capacity is larger medially in the direction of the handle. The rims are edges rising marginally out from the bowl with a greater depth toward the handle but rising therefrom.

The minor transverse concave extent 20 of the bowl is between lateral parallel rim portions 21. An angle 22 of approximately 105° is formed by marginal radii from edge 21 of the concave portion 20. This radius of the arc of 105° is greater than the longitudinal radius of the face 15. To the extent that the edge portions 21 are straight or approximately parallel to the axis of the handle 1, they are effective to cooperate toward the complete removal of contents 23 from a container 24 with the spoon, scoop, or tool effective to scrape the entire contents from the container side walls.

In some instances it may be desired to provide the face 15 with ribs, flutes or teeth 25 having tendency to lift the congealed material from the face 15, especially when of an extremely low degree of temperature.

The chamber 7 toward the bowl portion may extend from the central portion of the bowl or may be widened to approximate the full face extent.

In the operation of the tool herein, as it is inserted into the congealed material, there is an agitation of the liquid in the chamber 3. As the portion 19 is lifted from the mass 23, the tool is normally somewhat inverted and further agitation of the liquid takes place. It thereby conducts heat from the hand 26 of the operator through the walls of the handle into the liquid. In practice this is normally a sufficient temperature rise to maintain the face 15, 16, above the freezing temperature of the material. This lubricates the tool so that the formed service portion quickly and freely slides into the bowl from the severing rim and as freely is released therefrom.

It has been found in practice that the tool may be reworked from tubular or sheet metal or even die cast of an aluminum silica alloy and then even be of solid construction throughout. The heat conductivity of this and like materials as herein designed is to be sufficient to maintain the bowl temperature at a point above freezing in usual commercial operations. The chamber construction, however, may increase this heat conductivity. As such wall conductivity is more rapid for the tool, the tool may be effective against adherence of material thereto and thus be practically adaptable to approach continuous service. As the temperature maintained is only slightly above the freezing point of the material, there is no tendency for caking of the caseins or other solids. The tool having a general form of smooth contour throughout is readily cleansed and therefore highly sanitary.

In some instances it may be desired to provide a safety blow-off for the tool. To this end, the plug 10 is provided with port 27 therethrough closed by a low melting point, fusible plug, such as sealing wax or a suitable alloy. This plug 28 is fusible at a temperature normally below the boiling point of the liquid employed in the tool. If the tool should be accidentally laid upon a hot surface or by some other means the fluid should be heated to create a pressure within the tool, the plug will fuse or blow out and permit pressure escape without rupture of the tool. This plug may be easily replaced.

This application is a continuation-in-part of copending application Ser. No. 740,806, filed August 21, 1934, Service portion gathering, and a continuation of copending application Ser. No. 22,946, filed May 23, 1935, Tools for handling congealed materials.

What is claimed and it is desired to secure by Letters Patent is:

1. A dispensing tool for congealed material embodying a handle and a bowl, said bowl being provided with a bottom, rim, and sides between the bottom and rim, said rim having a material severing portion, a side forming a concave face extending from the severing rim portion, and ribs on said face integral therewith and spaced by grooves.

2. A scoop of the character described comprising a body formed into a material receiving bowl having a forward cutting edge, and a rear edge, said forward and rear edges being joined by concave side edges, said bowl being provided upon its inner face with flutes extending between the cutting and rear edges, there being a handle connected with the bowl, and means within the bowl facilitating the easy detachment of frozen material therefrom.

3. A scoop comprising a bowl, and a handle therefor having a grip portion merging into the bowl from a side portion of the bowl toward the center of the bowl, said bowl having a terminal severing rim extending transversely of the handle on the remote side of the bowl from the handle, said severing rim terminating in a pair of edges similarly extending in the direction of the handle, said bowl being of maximum concave dimension centrally from the severing rim toward the handle.

4. A dispensing tool for congealed material embodying a handle, a bowl, a rim for the bowl having a material severing portion and a remote portion, and approximately parallel side portions therebetween marginally of approximately straight line extent in the direction of the handle and concave toward the axis of said handle and spaced therefrom.

5. A congealed material gathering tool including a directing handle, and a bowl having an arc of shorter radius in the direction of the bowl extent toward the handle and of greater radius transversely of the handle, the latter radius being of less arc than the former.

6. A scoop of the class described comprising a handle and a concave bowl integral therewith, said bowl and handle being hollow and adapted to be partly filled with a heat dissipating liquid, said bowl comprising a terminal concave severing rim extending transversely of the handle, concave side rims extending from the extremities of the severing rim approximately parallel to each other and in planes approximately parallel to the axis of the handle, the radius of the severing rim being greater than the radius of the side rims.

7. A congealed material gathering integral tool including a directing handle, and a bowl having a bottom, sides rising from the bottom and terminating in an endless rim having a convex severing rim portion, said bowl having its concave face more abruptly curved toward the severing rim portion than toward the handle.

8. An integral dispensing tool for congealed material embodying a bowl, and a directly adjacent handle limited to single grip extent, said bowl being provided with a bottom, rim, and sides between the bottom and rim, said rim being all to one side of the axis of the handle and including a material-severing portion, said bowl having a concave face extending from the rim at the severing portion, there being a closed chamber extending from said handle and isolated from the bowl by a region of the wall of the bowl greater than the cross-section of said chamber transversely of the handle, said chamber being adapted to contain liquid, whereby there may be heat conducted from the grasped handle and liquid to the bowl, thereby to avoid sticking of congealed material to the bowl.

9. An integral dispensing tool embodying a receiver for congealed material, and a heat-conducting directly-adjacent handle limited to a single grip extent from the receiver, said receiver being provided with a bottom and a rim, and sides between the bottom and rim, said rim having a material-severing portion spaced from the grip, and a side forming a concave face extending from the severing rim portion, said receiver wall having a series of teeth spaced by the groove means extending toward the severing rim.

10. A dispensing tool for congealed material embodying a handle and a bowl, said bowl being provided with a bottom, rim, and sides between the bottom and rim, said rim having a material-severing portion, a side forming a concave face extending from the severing rim portion, there being approximately parallel rib and groove means integral with the bowl concave face.

11. A dispensing tool for congealed material embodying a handle, a bowl, a rim for the bowl having a material-severing portion and a remote portion, and side portions therebetween concave in their extent away from the severing rim portion.

12. An integral metallic dispensing scoop of the character described comprising a single-walled body formed into a material-receiving bowl having a cutting edge with a concave edge extending therefrom, and a handle having one end of its grip portion directly connected to said bowl, the said grip portion of the handle being of such length that it will be normally gripped close to the bowl, whereby heat from the operator's hand will be conducted through the handle directly to the bowl.

13. An integral metallic dispensing scoop of the character described comprising a single-walled body formed into a material-receiving concave bowl having a cutting edge, a pair of edges concave in extent from the cutting edge to bring the medial portion of said concave edges closer to the bowl central portion than the cutting edge, and a handle having one end of its grip portion directly connected to said bowl approximately at the bowl central portion, the said grip portion of the handle being of such length that it will be normally gripped close to the bowl, whereby heat from the operator's hand will be conducted through the handle directly to the bowl.

14. An integral metallic dispensing scoop of the character described comprising a single-walled body formed into a material-receiving concave bowl having a cutting edge, a pair of edges concave in extent from the cutting edge, and a handle having one end of its grip portion directly connected to said bowl, the said grip portion of the handle being of such length that it will be normally gripped close to the bowl, said handle being hollow and merging into the wall of the bowl to form therewith a closed fluid chamber adapted to have liquid therein freely shiftable within said chamber as the scoop is oriented, whereby heat from the operator's hand will be conducted through the handle directly to the bowl.

SHERMAN L. KELLY.